United States Patent
Manca

(10) Patent No.: US 9,753,582 B2
(45) Date of Patent: Sep. 5, 2017

(54) POSITION-FILTERING FOR LAND-LIFT EVENTS

(71) Applicant: Synaptics Incorporated, San Jose, CA (US)

(72) Inventor: Gian Mario Manca, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 29 days.

(21) Appl. No.: 14/788,460

(22) Filed: Jun. 30, 2015

(65) Prior Publication Data
US 2017/0003819 A1 Jan. 5, 2017

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ........ G06F 3/041–3/048; G06F 3/0481; G06F 3/0421; G06F 3/042; G06F 3/0416; G06F 2203/04104; G06F 3/0418; G06F 2203/0339; G06F 3/03547; G06F 3/0362; G06F 2203/04808; G06F 3/04886
See application file for complete search history.

(56) References Cited

U.S. PATENT DOCUMENTS

| 7,932,896 | B2 | 4/2011 | Westerman | |
| 2002/0039092 | A1* | 4/2002 | Shigetaka | G06F 3/044 345/156 |
| 2006/0227114 | A1 | 10/2006 | Geaghan et al. | |
| 2008/0309630 | A1* | 12/2008 | Westerman | G06F 3/04883 345/173 |
| 2009/0058818 | A1 | 3/2009 | Chang et al. | |
| 2009/0101417 | A1 | 4/2009 | Suzuki et al. | |

(Continued)

OTHER PUBLICATIONS

Srinivasagam, "Differentiating Noise from Touch: the Key to Robust Capacitve Sensing," Published Oct. 25, 2010, EETimes; www.eetimes.com/document.asp?doc_id=1278360.*

(Continued)

*Primary Examiner* — Sanjiv D Patel
(74) *Attorney, Agent, or Firm* — Osha Liang LLP

(57) ABSTRACT

A processing system for position-filtering includes a sensor module and a determination module. The sensor module includes sensor circuitry coupled to sensor electrodes, and is configured to transmit transmitter signals and receive resulting signals with at least a portion of the sensor electrodes. The determination module is configured to determine first positional information for an input object in a sensing region based on the resulting signals, the first positional information including a detected displacement of the input object from a preceding frame, and determine second positional information from the first positional information. The second positional information includes a revised displacement determined by applying a correction factor to the detected displacement, the correction factor being based on a number of frames of the input object being detected in the sensing region, a noise scale, and a finger scale. The determination module is further configured to report the second positional information.

20 Claims, 4 Drawing Sheets

(56) References Cited

U.S. PATENT DOCUMENTS

| | | | |
|---|---|---|---|
| 2012/0229419 A1* | 9/2012 | Schwartz | G06F 3/0418 |
| | | | 345/174 |
| 2013/0154948 A1 | 6/2013 | Schediwy et al. | |
| 2013/0162588 A1* | 6/2013 | Wen | G06F 3/0416 |
| | | | 345/174 |
| 2014/0160056 A1* | 6/2014 | Mahalingam | G06F 3/044 |
| | | | 345/174 |
| 2014/0204059 A1 | 7/2014 | Geaghan | |
| 2014/0214353 A1* | 7/2014 | Barfield | G01D 3/036 |
| | | | 702/104 |
| 2014/0267093 A1* | 9/2014 | Comstock | G06F 3/044 |
| | | | 345/173 |
| 2014/0267131 A1* | 9/2014 | Elia | G06F 3/044 |
| | | | 345/174 |
| 2014/0278173 A1* | 9/2014 | Elia | G01R 35/007 |
| | | | 702/65 |
| 2015/0220210 A1* | 8/2015 | Sturdevant | G06F 3/044 |
| | | | 345/178 |
| 2016/0378251 A1* | 12/2016 | Aznoe | G06F 3/04812 |
| | | | 345/158 |

OTHER PUBLICATIONS

International Search Report and Written Opinion issued in counterpart International Application No. PCT/US2016/039801, dated Oct. 10, 2016 (12 pages).

* cited by examiner

POSITION-FILTERING FOR LAND-LIFT EVENTS

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a processing system for position-filtering, including a sensor module and a determination module. The sensor module includes sensor circuitry coupled to sensor electrodes, the sensor module configured to transmit transmitter signals and receive resulting signals with at least a portion of the sensor electrodes. The determination module is operatively connected to the sensor electrodes. The determination module is configured to determine first positional information for an input object in a sensing region based on the resulting signals, the first positional information including a detected displacement of the input object from a preceding frame, and determine second positional information from the first positional information. The second positional information includes a revised displacement determined by applying a correction factor to the detected displacement, the correction factor being based on a number of frames of the input object being detected in the sensing region, a noise scale, and a finger scale. The determination module is further configured to report the second positional information.

In general, in one aspect, embodiments relate to a method for baseline management including determining first positional information for an input object in a sensing region based on resulting signals, the first positional information including a detected displacement of the input object from a preceding frame, and determining second positional information from the first positional information, the second positional information including a revised displacement determined by applying a correction factor to the detected displacement. The correction factor is based on a number of frames of the input object being detected in the sensing region, a noise scale, and a finger scale. The method further includes reporting the second positional information.

In general, in one aspect, embodiments relate to an input device including a sensor electrodes configured to generate sensing signals, and a processing system connected to the sensor electrodes. The processing system is configured to determine first positional information for an input object in a sensing region based on the sensing signals, the first positional information including a detected displacement of the input object from a preceding frame, and determine second positional information from the first positional information. The second positional information includes a revised displacement determined by applying a correction factor to the detected displacement, the correction factor being based on a number of frames of the input object being detected in the sensing region, a noise scale, and a finger scale. The processing system is further configured to report the second positional information.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In particular, one or more embodiments is directed to position filtering. In the position filtering, positional information is determined for an input object in a sensing region of an input device. The positional information includes a detected displacement from a prior position. The detected displacement is processed through position filtering to obtain a revised displacement in accordance with one or more embodiments of the invention. In particular, the revised displacement is determined by applying a correction factor to the detected displacement.

Figure 1:
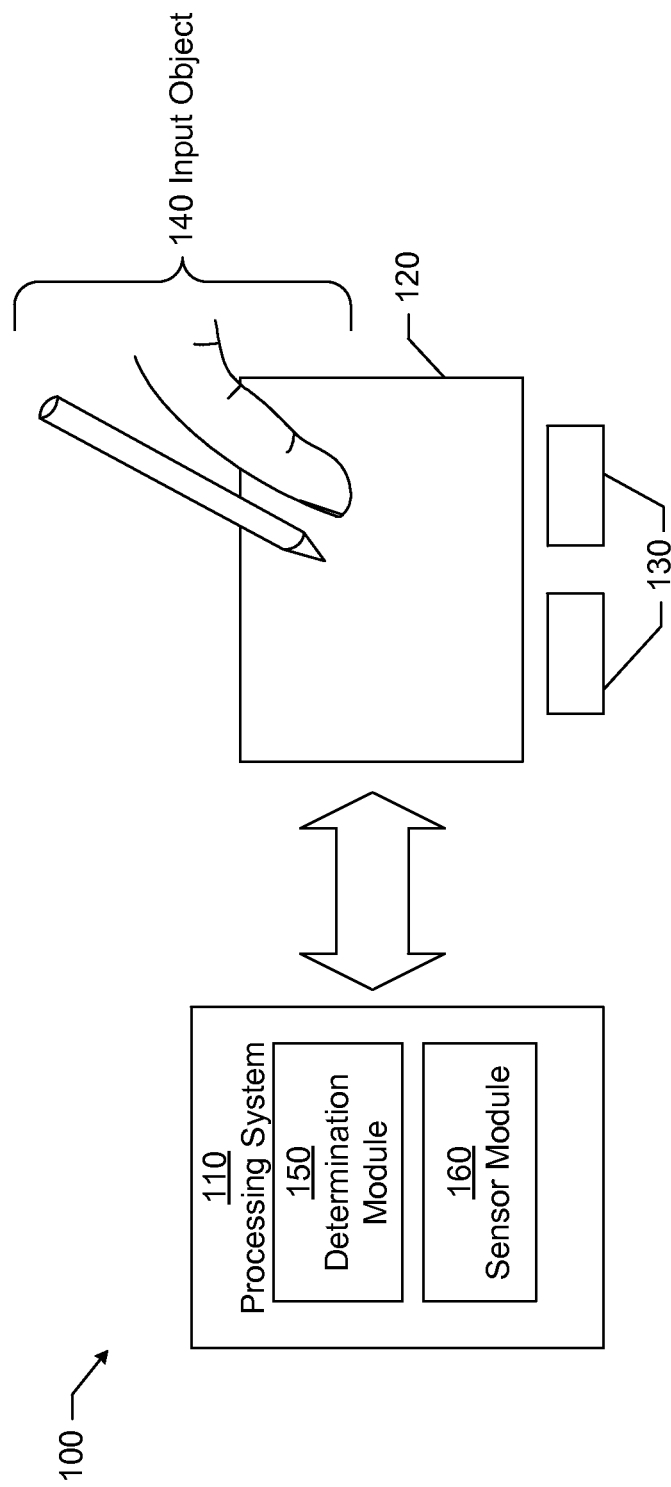
FIGS. 1 and 2 are block diagrams of an example system that includes an input device in accordance with an embodiment of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In one or more embodiments, the input device captures the sensing region on a per frame basis. Each frame is time window during which a single capture of the status of the sensing region with respect to the presence any input objects is performed. During a frame, any and all input objects may be approximated as being stationary. In other words, the time window of the frame is so short as to be effectively instantaneous to a human operator. In one or more embodiments of the invention, at the end of the frame, a report may be transmitted to other components of the processing system, input device, host system, or other device, or any combination thereof. Each report includes positional information regarding any input objects in the sensing region.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2:
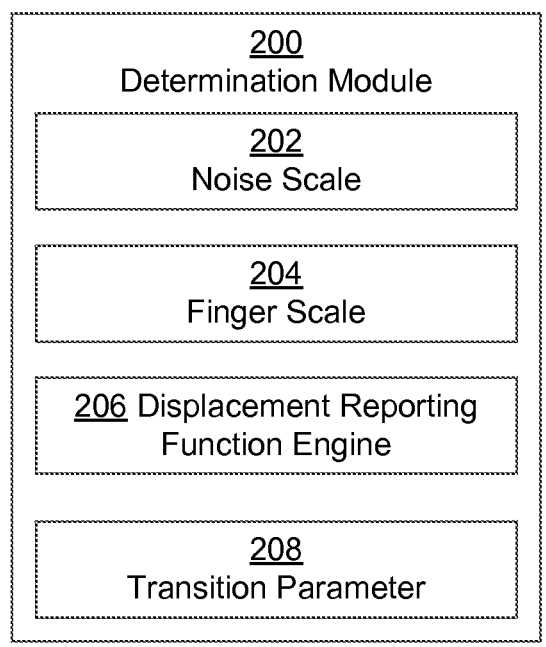

FIG. 2 shows a schematic diagram of a determination module (200), such as the determination module shown in FIG. 1. As shown in FIG. 2, the determination module (200) may include a noise scale parameter (202), a finger scale parameter (204), a displacement reporting function engine (206), and a transition parameter (208). Each of these is described below.

The noise scale parameter (202) is a parameter that maintains a noise scale value. In other words, the noise scale value specifies an amount of displacement that may be due to noise from the sensor electrodes. In other words, the displacement is a distance from a previous frame reported position to the current frame detected position. When the determination module detects a change in position, some of the change may be due to noise. Thus, the noise scale parameter stores the expected amount of displacement that is due to noise.

The finger scale parameter (204) is a parameter that maintains a finger scale value. In one or more embodiments of the invention, the finger scale value specifies an amount of displacement that may be due to compression of a finger on the sensor electrodes. In other words, as a finger compresses onto the sensing region, the initial detected position (i.e., for the uncompressed finger) and the final detected position (i.e., for the compressed finger) may be different by an amount less than the size of the finger. Such compression may occur, for example, during a tapping operation whereby the finger is tapping on the touch surface of the sensing region. The difference may be maintained in the finger scale parameter (204) as the finger scale value. The finger scale value may be determined using empirical data. The empirical data may be for a small, average, or large sized finger. In one or more embodiments of the invention, multiple instances of the position filter described herein may execute at the same time. For example, a separate instance may execute for pens, a separate instance for small fingers, a separate instance for larger fingers, a separate instance for thumbs, and so forth. Once the type of particular input object is identified, the appropriate instance of the position filter may be used based on the type of input object.

In one or more embodiments of the invention, the displacement reporting function engine (206) includes functionality to determine a displacement reporting function. A displacement reporting function is a function of detected displacement and produces a revised displacement. The revised displacement may be less than the detected displacement in order to account for changes in position due to noise and finger compression. Thus, the displacement reporting function defines a correction factor to apply to the detected displacement that produces the revised displacement.

In one or more embodiments, each displacement reporting function has a threshold displacement value, whereby for any detected displacement greater than the threshold displacement value, the revised displacement is equal to the detected displacement. Thus, for any detected displacement greater than the threshold displacement value, the correction factor is equal to one. In one or more embodiments, each displacement reporting function is a piecewise function having intervals based on intervals that are dependent on the noise scale and finger scale. For example, the first interval may be from zero displacement to the noise scale value, the second interval may be from the noise scale value to the finger scale value, and the third interval may be from the finger scale value to the threshold displacement value.

In some embodiments, the first interval is the same sub-function across all displacement reporting functions. In other words, when the detected displacement is less than the noise scale, each displacement reporting function produces the same correction factor.

In some embodiments, the first interval is heterogeneous across the displacement reporting functions. In such embodiments, when the detected displacement is less than the noise scale, the displacement reporting functions produces heterogeneous correction factors. Thus, the correction factor applied is dependent on the number of frames in which the input object is consecutively present in the sensing region.

The piecewise functions may be piecewise linear functions. In other words, sub-functions of the displacement reporting functions may be linear functions. In one or more embodiments of the invention, one or more of the sub-functions of the displacement reporting functions are non-linear.

In some embodiments, the displacement reporting functions are a predefined set of functions that are each related to a distinct corresponding consecutive number of frames. In such embodiments, the displacement reporting function engine (206) includes functionality to select from the predefined set of functions. In other embodiments, the displacement reporting functions are calculated based on an initial displacement reporting function, a final displacement reporting function, and a number of frames that the input object is detected as being present in the sensing region. In one or more embodiments, the combination of the displacement functions causes a decrease in the correction factor as the number of frames that the input object is present in the sensing region increases.

In one or more embodiments of the invention, the transition parameter (208) specifies a speed at which the displacement reporting function transitions from an initial displacement reporting function to a final displacement reporting function. In one or more embodiments, the speed is a function of the number of frames that the input object is consecutively detected in the sensing region. In one or more embodiments of the invention, the transition parameter (208) is a value. In one or more embodiments, the transition parameter is a function.

While FIGS. 1 and 2 show a configuration of components, other configurations may be used without departing from the scope of the invention. For example, various components may be combined to create a single component. As another example, the functionality performed by a single component may be performed by two or more components.

Figure 3:
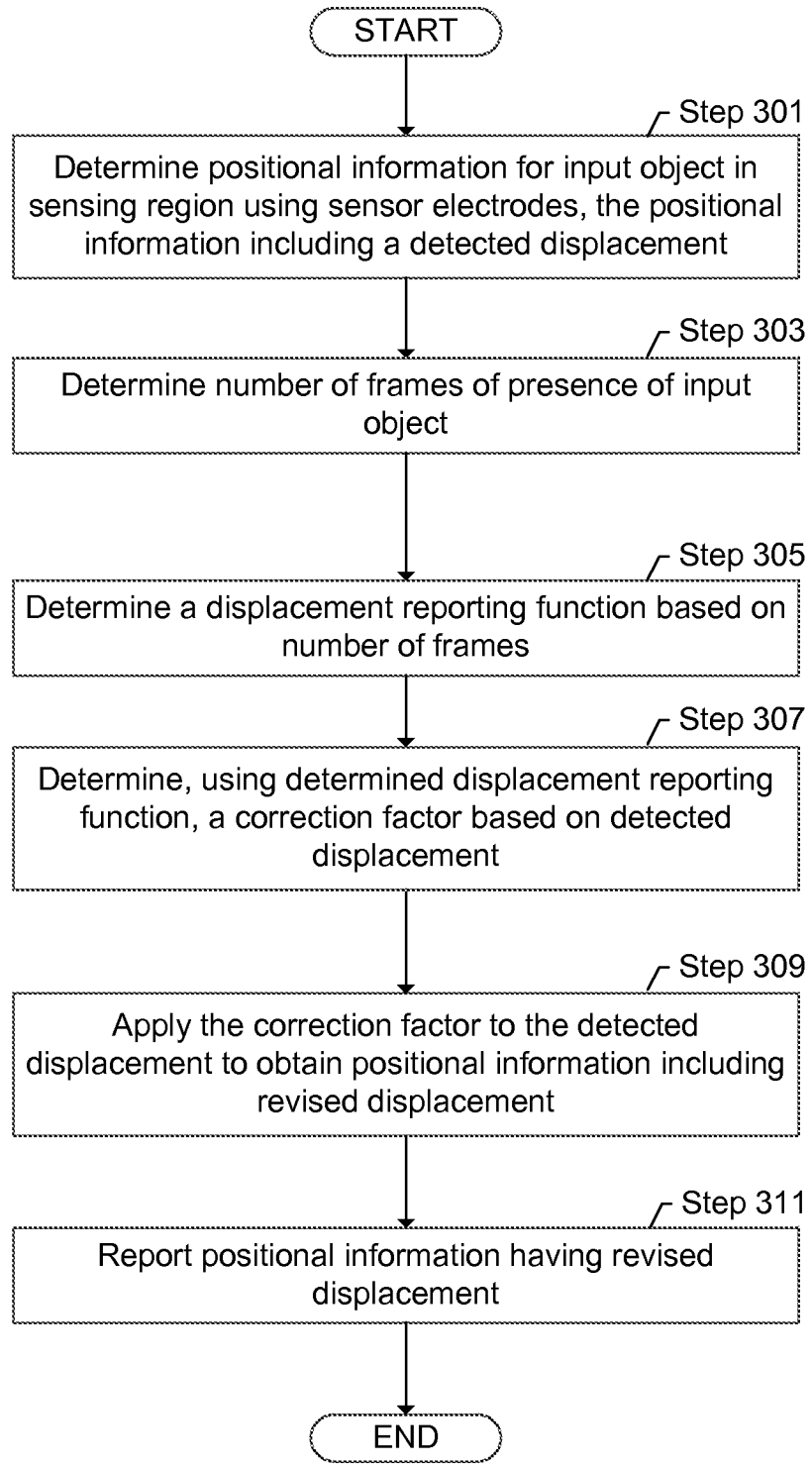
FIG. 3 shows a flowchart in accordance with one or more embodiments of the invention.

FIG. 3 shows a flowchart in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 301, positional information for an input object in the sensing region is determined using sensor electrodes. The positional information includes a detected displacement of the input object. In one or more embodiments, determining positional information includes transmitting sensing signals and receiving resulting signals using the sensor electrodes. Based on the magnitude of the sensing signals, the current position of the input object in the sensing region is determined. From a prior frame in which the input object is detected, the immediately preceding position of the input object in the sensing region is determined. In one or more embodiments, the immediately preceding position is the reported position of the input object. However, the detected position may be used without departing from the scope of the invention. In one or more embodiments, the prior frame is used only when the prior frame is within a threshold amount of time or a threshold number of frames to the current frame. In other words, if more than the threshold number of frames pass without the input object being detected, then the displacement may not be considered. Continuing with the discussion, the distance from the immediately preceding position may be the detected displacement of the input object. In some embodiments, the immediately preceding position is the reported position in a previous frame. In other embodiments, the immediately preceding position is a detected position from a previous frame.

In Step 303, the number of frames in which the input object is present is determined in accordance with one or more embodiments of the invention. In one or more embodiments, a counter may be used to determine the number of frames in which the input object is present. In such a scenario, the counter is incremented for each frame that the input object is detected, and the counter is reset for each frame that the input object is not present. Thus, determining the number of frames that the input object is present may include incrementing the counter for the current frame and obtaining the resulting number from the counter. Other techniques may be used to determine the number of frames in which the input object is consecutively present without departing from the scope of the invention. In one or more embodiments, a tapping finger may have at most a low number of consecutive frames in which the input object is detected. Specifically, each time the finger is removed, the input object is not detected. A swipe has an ever increasing number of consecutive frames in which the input object is consecutively present.

In Step 305, the displacement reporting function is determined based on the number of frames in accordance with one or more embodiments of the invention. In some embodiments in which predefined displacement reporting functions exists that are mapped to numbers of consecutive frames, determining the displacement reporting function may be selecting the displacement reporting function that matches the consecutive number of frames. In one or more embodiments, an initial displacement reporting function is used when the number of frames that the input object is consecutively present is less than a minimal threshold number. In such a scenario, if the number of consecutive frames is less than the minimum threshold number, then the initial displacement reporting function is used. If the number of consecutive frames is greater than the minimum threshold number, then the processing may proceed as follows.

In one or more embodiments of the invention, if the transition parameter is a function, then the transition parameter function is applied to the number of consecutive frames to obtain a revised value. In one or more embodiments of the invention, if the transition parameter is a value, then the value may be multiplied by the number of consecutive frames to obtain the revised value. The revised value may then be used to generate the displacement reporting function.

Generating a displacement reporting function may be performed as follows. A percentage of the difference between the initial displacement reporting function and final displacement reporting function is calculated. In particular, the higher number of consecutive frames that is mapped to the initial displacement reporting function, is subtracted from the smallest number of consecutive frames that is mapped to the final displacement reporting function, to obtain an intermediate result. The current number of consecutive frames (determined in Step 303) may be divided by the intermediate result to obtain the percentage. The percentage of the difference of the two functions is added to the initial function to obtain the current displacement reporting function. For example, for a point (i.e., detected displacement, reported displacement pair) on the initial displacement reporting function, consider the corresponding (i.e. with the same detected displacement) point on the final displacement reporting function. The difference of the reported displacements of the two points is multiplied by the calculated percentage and, the intermediate result added to value of reported displacement of the point on the initial displacement reporting function. The result of the calculation is a new reported displacement for the same detected displacement and corresponds to a point on the current displacement reporting function. Additional points on the current displacement reporting function may be calculated in order to generate the displacement reporting function.

By way of an example, consider the following scenario. The initial displacement reporting function may be used for zero consecutive frames, and the final displacement reporting function may be for any number of frames over 25. If the current number of consecutive frames is 15, then the percentage of the difference is 60% (i.e., 15/(25−0)). If point (x, $y_{init}$) is on the initial displacement reporting function, and (x, $y_{final}$) is on the final displacement reporting function, then, in the example, (x, $y_{init}+0.6*(y_{final}-y_{init})$) is on the generated displacement reporting function.

Continuing with FIG. 3, in Step 307, a correction factor is determined using the determined displacement reporting function. In other words, the displacement reporting function is applied to the detected displacement to obtain the correction. In Step 309, the correction factor is applied to the detected displacement to obtain positional information including the revised displacement. In other words, the result of applying the displacement reporting function to the detected displacement is the revised displacement. The revised displacement is added to the positional information. In one or more embodiments of the invention, the revised displacement replaces the detected displacement in the positional information. In other embodiments, the revised displacement supplements the detected displacement in the displacement reporting function.

In Step 311, the positional information having the revised displacement is reported in accordance with one or more embodiments of the invention. In one or more embodiments of the invention, reporting the positional information may be performed by sending positional information to the host, host operating system, application, or another component.

In one or more embodiments, Steps 307 and 309 may be performed as a single step. In such a scenario, the correction factor is the revised displacement. In one or more embodiments, Steps 305, 307, and 309 may be performed as a single step. For example, rather than generating a displacement reporting function, the detected displacement may be applied to the final displacement reporting function to obtain a final revised displacement. The final revised displacement may be multiplied by the percentage (discussed above) to obtain the revised displacement. Other techniques for combining or reordering Steps of FIG. 3 may be applied to obtain and report the revised displacement in accordance with one or more embodiments of the invention.

Further although FIGS. 2 and 3 present switching from an initial displacement reporting function based on time, in some embodiments, the switch may be based on the detected displacement being greater than the finger scale (204). In particular, in some embodiments, only when the detected displacement is greater than the finger scale, the system will transition to using the final displacement reporting function. For example, consider the scenario in which instead of tapping, wants to do a long press and still have a single point reported. The transition to the final displacement reporting function will be triggered only by the displacement becoming bigger than finger scale (204) in accordance with one or more embodiments of the invention. Thus, the system may still distinguish long presses from swipes, for the purpose of reducing swipes' lag.

Figure 4:
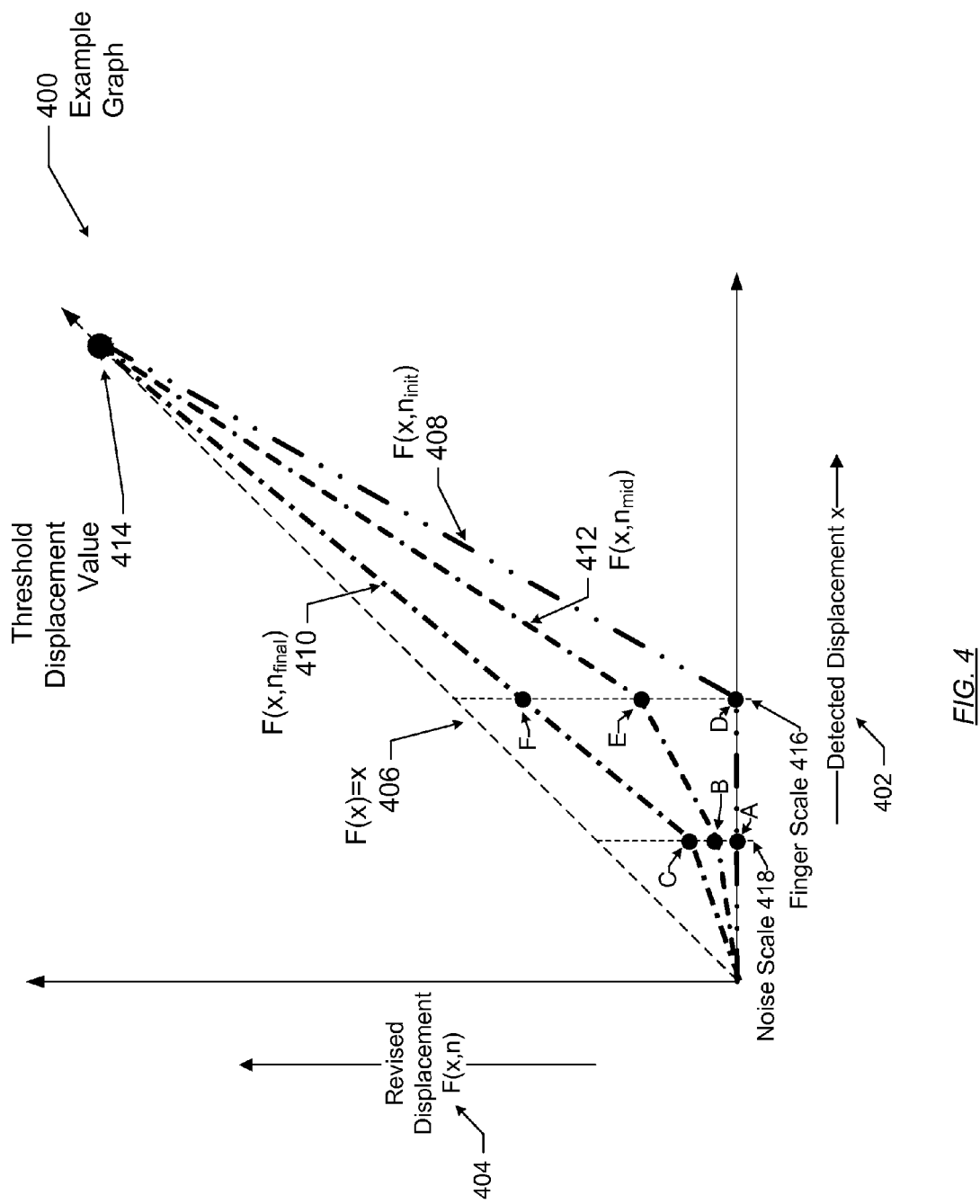
FIG. 4 shows an example graph in accordance with one or more embodiments of the invention.

FIG. 4 shows an example graph (400) in accordance with one or more embodiments of the invention. In the example graph (400), the detected displacement (402), denoted as an 'x', is on the horizontal axis, the revised displacement (404), denoted as 'F(x,n)', is on the vertical axis. The variable 'n' denotes the number of frames in which the input object is contiguously detected in the sensing region. F(x)=x (406) is the line showing where the detected displacement is equal to the revised displacement and is for illustration purposes only.

$F(x,n_{init})$ (408) is an initial displacement reporting function for when n is less than or equal to the minimum threshold number of consecutive frames. $F(x,n_{final})$ (410) is a final displacement reporting function for when n is greater than or equal to the maximum number of consecutive frames. $F(x,n_{mid})$ (412) shows a displacement reporting function that may exist between $F(x,n_{init})$ (408) and $F(x,n_{final})$ (410). Additional displacement reporting functions may exist between the initial displacement reporting function and the final displacement reporting function. The vertical distance between the displacement reporting function (e.g., $F(x,n_{init})$ (408), $F(x,n_{mid})$ (412), and $F(x,n_{final})$ (410)) and F(x)=x is the amount of lag introduced by the displacement reporting function. As shown, as the number of consecutive frames increases, the lower the lag becomes. At and after the threshold displacement value (414), the displacement reporting functions do not exhibit any lag in accordance with one or more embodiments of the invention.

Displacement reporting functions may be piecewise functions, such as those shown in the example graph. As shown in the example graph, the intervals may vary between displacement reporting functions. For example, $F(x,n_{init})$ (408) has an interval from 0 to the finger scale (416) and another interval from the finger scale (416) to the threshold displacement value. $F(x,n_{mid})$ (412) has an interval from 0 to the noise scale (418), an interval from the noise scale (418) to the finger scale (416), and an interval from the finger scale (416) to the threshold displacement value. $F(x,n_{final})$ (410) has an interval from 0 to the noise scale (418), and another interval from the noise scale (418) to the threshold displacement value.

Points A, B, C, D, E, and F are shown in the example graph as being points that map the noise scale (418) or finger scale (416) to the corresponding revised displacement for the corresponding displacement reporting function. By having Points C and B be mapped to a non-zero revised displacement, if the input object remains stationary, the system will creep toward the reported position being the actual position of the input object. The closer that the points are to the F(x)=x, the faster the creep.

Using the example graph, consider the scenario in which the user is tapping the user's finger. When the user intends to tap the finger in the same position, noise and the user's finger being compressed over the course of several frames during a tap may cause the input device to detect different positions that the user is touching. However, because the user is tapping the finger, the user's finger is not consecutively present for many frames in the sensing region. For example, the user may remain with $n_{init}$ or fewer consecutive frames in which the finger is present. Because $F(x, n_{init})$ (408) produces minimal or zero displacement as the revised displacement, the user may be deemed to be selecting the same position. In one or more embodiments, the threshold displacement value is twice the finger scale.

Continuing with the discussion using the example graph, consider the scenario in which the user is performing a swipe operation. With a swipe operation, the user's finger is consecutively present in the sensing region. If a fast swipe occurs, where the displacement is bigger than the threshold displacement value, no lag exists. If a slower swipe occurs, the system may rapidly switch from $F(x,n_{init})$ (408) to $F(x,n_{mid})$ (412) to $F(x,n_{final})$ (410), resulting in ever decreasing amounts of positional lag. As shown, one or more embodiments provide a technique for managing jitter caused by finger compression and noise during tapping while having a reduction in lag during swipe operations.

Although the above discussion is presented with respect to a single input object, the above discussion may be applied to multiple input objects. Each input object may be processing individually using the techniques described above, or as a group.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for position-filtering, comprising:
sensor circuitry configured to be coupled to a plurality of sensor electrodes, the sensor circuitry configured to transmit transmitter signals and receive resulting signals with at least a portion of the plurality of sensor electrodes; and
determination circuitry configured to:
determine first positional information for an input object in a sensing region based on the resulting signals, the first positional information comprising a detected displacement of the input object from a preceding frame,
determine, using a piecewise function and based on a number of frames of the input object being present in the sensing region, a correction factor for the detected displacement, wherein the piecewise function comprises a first interval for displacement to a noise scale value, a second interval for displacement to a finger scale value, and a third interval for displacement starting after the finger scale value and ending at a threshold displacement value,
apply, the correction factor to the detected displacement to obtain a revised displacement, wherein the revised displacement is less than the detected displacement in the third interval, determine second positional information comprising the revised displacement, and report the second positional information.

2. The processing system of claim 1, wherein the correction factor resets after the input object leaves the sensing region.

3. The processing system of claim 1, wherein the correction factor decreases over the number of frames, and wherein the input object is continually detected as being present in the sensing region over the number of frames.

4. The processing system of claim 1, wherein the revised displacement is equal to the detected displacement when the detected displacement is greater than the threshold displacement value.

5. The processing system of claim 1, wherein determining using the piecewise function and based on the number of frames comprises:

determining, from a plurality of displacement reporting functions, a displacement reporting function according to the number of frames, wherein the piecewise function is the displacement reporting function.

6. The processing system of claim 5, wherein, when the detected displacement is less than the noise scale, the determining the displacement reporting function produces a same correction factor regardless of the number of frames.

7. The processing system of claim 5, wherein, when the detected displacement is less than the noise scale, the determining the displacement reporting function produces heterogeneous correction factors dependent on the number of frames.

8. The processing system of claim 5, wherein determining the displacement reporting function based on the number of frames comprises:

selecting an initial displacement reporting function as the determined displacement reporting function when the number of frames is less than a threshold number.

9. The processing system of claim 1, wherein the finger scale value compensates for displacement due to a compression of a finger.

10. A method for baseline management comprising:

determining first positional information for an input object in a sensing region based on resulting signals, the first positional information comprising a detected displacement of the input object from a preceding frame;

determining, using a piecewise function and based on a number of frames of the input object being present in the sensing region, a correction factor for the detected displacement, wherein the piecewise function comprises a first interval for displacement to a noise scale value, a second interval for displacement to a finger scale value, and a third interval for displacement starting after the finger scale value and ending at a threshold displacement value;

applying, the correction factor to the detected displacement to obtain a revised displacement, wherein the revised displacement is less than the detected displacement in the third interval;

determining second positional information comprising the revised displacement; and reporting the second positional information.

11. The method of claim 10, wherein the correction factor resets after the input object leaves the sensing region.

12. The method of claim 10, wherein the correction factor decreases over the number of frames, and wherein the input object is continually detected as being present in the sensing region over the number of frames.

13. The method of claim 10, wherein the revised displacement is equal to the detected displacement when the detected displacement is greater than the threshold displacement value.

14. The method of claim 10, wherein determining using the piecewise function and based on the number of frames comprises:

determining, from a plurality of displacement reporting functions, a displacement reporting function according to the number of frames, wherein the piecewise function is the displacement reporting function.

15. The method of claim 14, wherein, when the detected displacement is less than the noise scale, the determining the displacement reporting function produces a same correction factor regardless of the number of frames.

16. The method of claim 14, wherein, when the detected displacement is less than the noise scale, the determining the displacement reporting function produces heterogeneous correction factors dependent on the number of frames.

17. The method of claim 14, wherein determining the displacement reporting function based on the number of frames comprises:

selecting an initial displacement reporting function as the determined displacement reporting function when the number of frames is less than a threshold number.

18. The method of claim 10, wherein the finger scale value compensates for displacement due to a compression of a finger.

19. An input device comprising:

a plurality of sensor electrodes configured to generate sensing signals; and a processing circuitry connected to the plurality of sensor electrodes and configured to:

determine first positional information for an input object in a sensing region based on the sensing signals, the first positional information comprising a detected displacement of the input object from a preceding frame, determine, using a piecewise function and based on a number of frames of the input object being present in the sensing region, a correction factor for the detected displacement, wherein the piecewise function comprises a first interval for displacement to a noise scale value, a second interval for displacement to a finger scale value, and a third interval for displacement starting after the finger scale value and ending at a threshold displacement value, apply, the correction factor to the detected displacement to obtain a revised displacement, wherein the revised displacement is less than the detected displacement in the third interval, determine second positional information comprising the revised displacement and report the second positional information.

20. The input device of claim 19, wherein determining using the piecewise function and based on the number of frames comprises:

determining, from a plurality of displacement reporting, a displacement reporting function according to the number of frames, wherein the piecewise function is the displacement reporting function.

* * * * *